US012272846B2

(12) United States Patent
Folick et al.

(10) Patent No.: US 12,272,846 B2
(45) Date of Patent: Apr. 8, 2025

(54) FUEL CELL SYSTEM

(71) Applicant: Toyota Motor Engineering & Manufacturing North America, Inc., Plano, TX (US)

(72) Inventors: Daniel Charles Folick, Long Beach, CA (US); Matthew K. McClory, Aliso Viejo, CA (US); Dakota Kelley, Garland, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 251 days.

(21) Appl. No.: 17/563,268

(22) Filed: Dec. 28, 2021

(65) Prior Publication Data

US 2023/0207838 A1    Jun. 29, 2023

(51) Int. Cl.
*H01M 8/0247*    (2016.01)
*H01M 8/00*    (2016.01)

(52) U.S. Cl.
CPC ......... *H01M 8/0247* (2013.01); *H01M 8/002* (2013.01); *H01M 2250/10* (2013.01); *H01M 2250/40* (2013.01)

(58) Field of Classification Search
CPC ............... H01M 8/0247; H01M 8/002; H01M 2250/10; H01M 2250/40; H01M 8/24; H01M 8/04895; H01M 8/04925; H01M 8/04865; H01M 8/04873; H02J 4/00; H02J 7/34; H02J 9/061; H02J 9/062; H02J 2300/30; H02J 2310/12; H02J 1/102; H02J 1/00; H02J 1/10; Y02E 60/50

See application file for complete search history.

(56) References Cited

U.S. PATENT DOCUMENTS

| | | | |
|---|---|---|---|
| 8,872,392 | B1 | 10/2014 | Gurunathan et al. |
| 2004/0247561 | A1* | 12/2004 | Seo ........................ A61K 9/1075 |
| | | | 525/450 |
| 2006/0172162 | A1 | 8/2006 | Pearson |

(Continued)

FOREIGN PATENT DOCUMENTS

| | | |
|---|---|---|
| EP | 3648276 A1 | 5/2020 |
| EP | 3866320 A1 | 8/2021 |
| WO | 2013037031 A1 | 3/2013 |

OTHER PUBLICATIONS

Extended European Search Report for EP 22214002.2, dated Sep. 14, 2023, 8 pages.

(Continued)

*Primary Examiner* — Helen Oi K Conley
(74) *Attorney, Agent, or Firm* — Christopher G. Darrow; Darrow Mustafa PC

(57) ABSTRACT

A fuel cell system includes a plurality of fuel cell units each configured to generate lower-voltage DC power. The fuel cell system includes a plurality of DC-DC converters each electrically connected to each of the fuel cell units and configured to convert the lower-voltage DC power to higher-voltage DC power. The fuel cell system includes a primary load power conversion unit electrically connected to the plurality of DC-DC converters and configured to output a primary load. The fuel cell system includes an auxiliary load power conversion unit electrically connected to the plurality of DC-DC converters and configured to output an auxiliary load.

14 Claims, 3 Drawing Sheets

(56) References Cited

U.S. PATENT DOCUMENTS

| | | | | |
|---|---|---|---|---|
| 2008/0278968 A1* | 11/2008 | Srinivasan | ............ | H02M 7/497 307/77 |
| 2012/0326516 A1* | 12/2012 | Gurunathan | ............ | H02J 3/381 307/43 |
| 2013/0253716 A1 | 9/2013 | Gross et al. | | |

OTHER PUBLICATIONS

Bozzolo, M. et al., "Moving Towards Climate Neutrality—Fuel Cell Technology for Future Energy and Propulsion Systems", MTU Solutions, Retrieved from https://www.mtu-solutions.com/na/en/technical-articles/2020/moving-towards-climate-neutrality-fuel-cell-technology-for-future-energy-and-propulsion-systems.html, Nov. 18, 2020 (11 pages).

Wolk, R.H., "Fuel Cells for homes and hospitals," IEEE Spectrum, pp. 45-52 (8 pages).

* cited by examiner

FUEL CELL SYSTEM

TECHNICAL FIELD

The embodiments disclosed herein relate to a fuel cell system and, more particularly, to a fuel cell system for supplying power to an external unit and one or more auxiliary systems of the fuel cell system.

BACKGROUND

Fuel cell systems can supply power to one or more systems external to the fuel cell system. For example, fuel cell systems can be used to power vehicles, buildings, or data centers.

SUMMARY

This section generally summarizes the disclosure and does not comprehensively explain its full scope or all its features.

In one aspect, a fuel cell system includes a plurality of fuel cell units configured to generate lower-voltage DC power. The fuel cell system includes a plurality of DC-DC converters electrically connected to the fuel cell units and configured to convert the lower-voltage DC power to higher-voltage DC power. The fuel cell system includes a primary load power conversion unit electrically connected to the plurality of DC-DC converters and configured to output a primary load. The fuel cell system includes an auxiliary load power conversion unit electrically connected to the plurality of DC-DC converters and configured to output an auxiliary load.

In another aspect, a fuel cell system includes a fuel cell container configured to house a plurality of fuel cell units configured to generate lower-voltage DC power. The fuel cell container is also configured to house a plurality of DC-DC converters electrically connected to the fuel cell units and configured to convert the lower-voltage DC power to higher-voltage DC power. The fuel cell system also includes a power electronics container configured to house a primary load power conversion unit. The primary load power conversion unit is electrically connected to the plurality of DC-DC converters and is configured to output a primary load. The power electronics container is also configured to house an auxiliary load power conversion unit. The auxiliary load power conversion unit is electrically connected to the plurality of DC-DC converters and is configured to output an auxiliary load.

In yet another aspect, a fuel cell system includes a plurality of fuel cell units configured to generate lower-voltage DC power. The fuel cell system includes a plurality of DC-DC converters electrically connected to the fuel cell units and configured to convert the lower-voltage DC power to higher-voltage DC power. The fuel cell system includes a primary load power conversion unit electrically connected to the plurality of DC-DC converters and configured to output a primary load. The fuel cell system includes an auxiliary load power conversion unit electrically connected to the plurality of DC-DC converters and configured to output an auxiliary load. The fuel cell system also includes a programmable logic controller configured to operate the fuel cell system according to a power request.

These and other aspects will be described in additional detail below.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a fuel cell system for supplying power to an external unit and one or more auxiliary systems of the fuel cell system. The fuel cell system includes a container for housing the fuel cell system and a communication interface for operating the fuel cell system.

Figure 1:
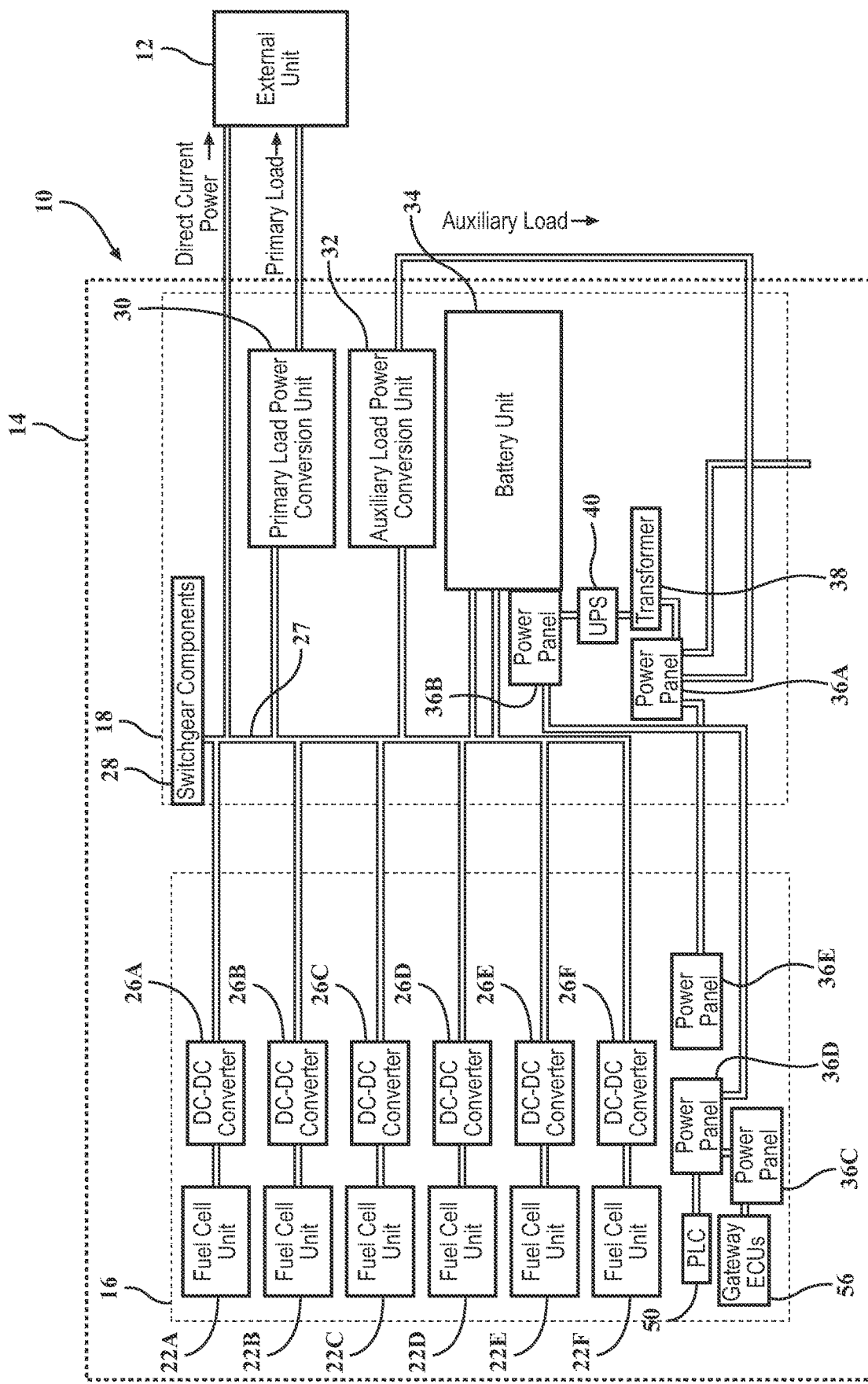
FIG. 1 illustrates one example of a fuel cell system.

Referring to FIG. 1, an example of the fuel cell system 10 is shown. The fuel cell system 10 can be used to provide power to an external unit 12. The external unit 12 can be a building, such as a residential or commercial building. However, it should be understood that the external unit 12 can be any type of electricity demanding structure, system, and the like. The external unit 12 can be configured to request power (e.g., make a power request or demand) from the fuel cell system 10 to receive power from the fuel cell system 10, or the external unit 12 can draw a load from the fuel cell system 10, which can measure the power draw and generate power accordingly.

The fuel cell system 10 can be housed in one or more containers. For example, the fuel cell system 10 can be housed in a single container 14. In another example, the fuel cell system 10 may be housed in two containers, for example, a fuel cell container 16 and a power electronics container 18. The fuel cell container 16 can house one or more components of the fuel cell system 10 and the power electronics container 18 can house one or more power electronics components of the fuel cell system 10, as will be described in further detail below.

Figure 2:
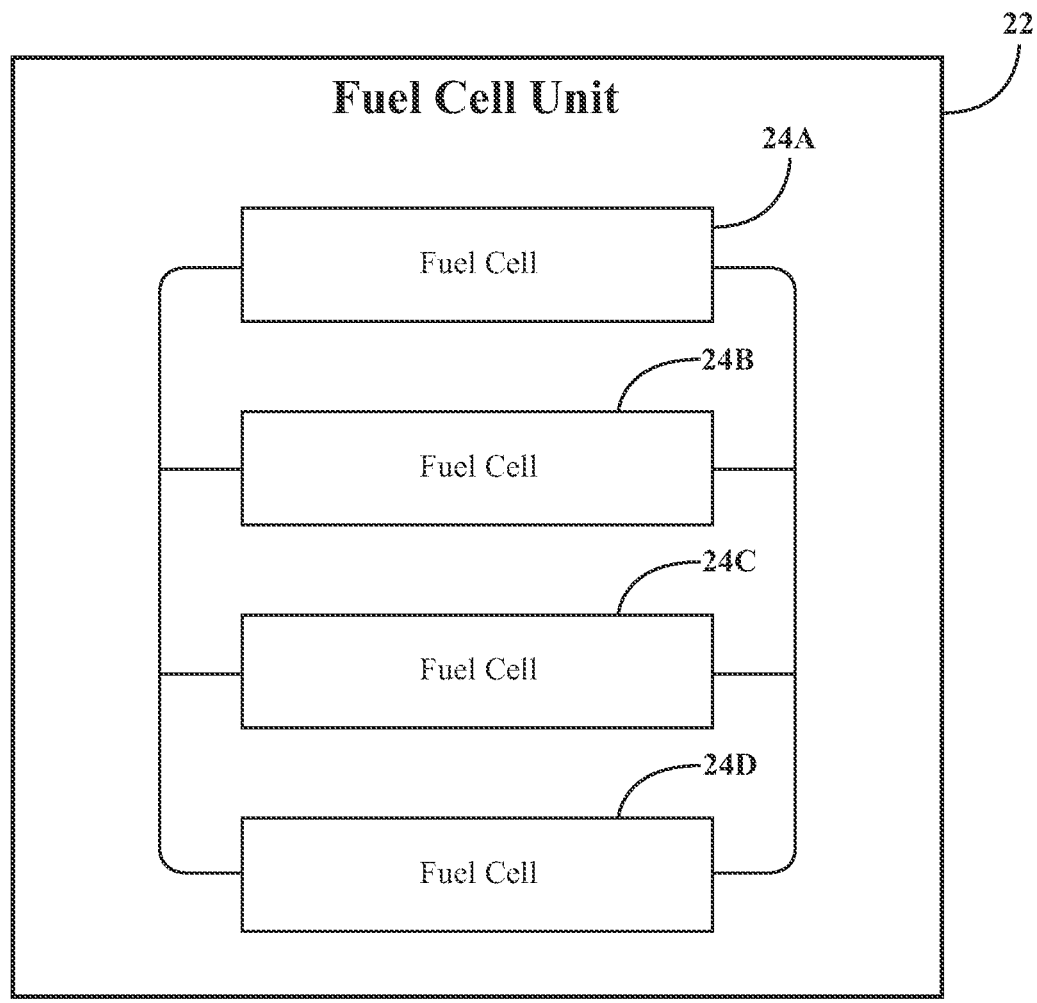
FIG. 2 illustrates one example of a fuel cell unit of the fuel cell system.

The fuel-cell system 10 includes a plurality of fuel cell units 22A-22F. Each of the fuel cell units 22A-22F may include four individual fuel cells that are connected in parallel. As best shown in FIG. 2, illustrated is a single fuel cell unit 22, which may be similar to any of the fuel cell units 22A-22F of FIG. 1. Here, the fuel cell unit 22 includes four fuel cells 24A-24D connected in parallel to each other. Each of the fuel cells 24A-24D may be an electrochemical cell that converts the chemical energy of a fuel an oxidizing agent into electricity. In one example, the fuel may be hydrogen, but any type of fuel suitable for different types of fuel cells may be utilized. The fuel cells 24A-24D can be configured to output direct current (DC) power. For example, each fuel cell unit 22 can output 240 kw of DC power, however this power can vary depending on the size and number of fuel cells included in the fuel cell unit.

Referring back to FIG. 1, the fuel cell system 10 also includes a plurality of DC-DC converters 26A-26F. The DC-DC converters 26A-26F can be housed in the fuel cell container 16. The DC-DC converters 26A-26F can be electrically connected to the fuel cell units 22A-22F, respectively. The DC-DC converters 26A-26F are configured to regulate the output voltage of the fuel cell units 22A-22F, respectively. For example, the DC-DC converters 26A-26F can regulate the output voltage of the fuel cell units 22A-22F to be 650V. The DC-DC converters 26A-26F can also convert the output power of the fuel cell units 22A-22F, respectively, to a higher voltage. For example, the DC-DC converters 26A-26F can convert the outputted 650V DC power from the fuel cell units 22A-22F to 1000V DC power. The DC-DC converters 26A-26F can also be electrically connected to one or more components of the power electronics container 18. The DC-DC converters 26A-26F can be any suitable DC-DC converters. For example, one or more of the DC-DC converters 26A-26F can be a Dynapower DPS-500 Bi-Directional DC-to-DC Converter sold by Dynapower Company, LLC of South Burlington, Vermont. However, any comparable DC-DC converter could be used.

The fuel cell system 10 also includes one or more switchgear components 28. The switchgear components 28 can be housed in the power electronics container 18. The switchgear components 28 can be DC switchgear components and can include one or more switches, circuit breakers, and/or fuses configured to connect the components of the fuel cell container 16 to the components of the power electronics container 18. For example, the switchgear components 28 can be electrically connected to the DC-DC converters 26A-26F, a primary load power conversion unit 30, an auxiliary load power conversion unit 32, and a battery unit 34. The switchgear components 28 can also be configured to supply the DC power outputted by the fuel cell units 22 to the external unit 12.

The primary load power conversion unit 30 can be housed in the power electronics container 18. The primary load power conversion unit 30 can be configured to supply a primary load (e.g., power) to the external unit 12. The primary load power conversion unit 30 can be electrically connected to the switchgear components 28 and can be configured to convert the DC power outputted by the DC-DC converters 26 to AC power. For example, the primary load power conversion unit 30 can convert the 1000V DC power outputted by the DC-DC converters 26 to 480V AC power, which can be supplied to the external unit 12. The primary load power conversion unit 30 can be any suitable power conversion unit such as an inverter. For example, the primary load power conversion unit 30 can be a Dynapower CPS-1500 1500 kW Utility-Scale Energy Storage Inverter sold by Dynapower Company, LLC of South Burlington, Vermont. The auxiliary load power conversion unit 32 can be housed in the power electronics container 18. The auxiliary load power conversion unit 32 can be configured to supply an auxiliary load (e.g., power) to one or more auxiliary systems 52 (e.g., parasitic systems) (see FIG. 3) of the fuel cell system 10. The auxiliary systems 52 can include one or more systems and/or components of the fuel cell system 10 that are necessary to keep the fuel cell system 10 operating. For example, the auxiliary load power conversion unit 32 can be configured to supply the auxiliary load to one or more power panels 36A-36E, transformers 38, uninterrupted power supplies 40, control systems, lighting systems, valves, sensors, etc. of the fuel cell system 10. Some of these components will be described in further detail below.

The auxiliary load power conversion unit 32 can be electrically connected to the switchgear components 28 and can be configured to convert the DC power outputted by the DC-DC converters 26 to AC power. For example, the auxiliary load power conversion unit 32 can convert the 1000V DC power outputted by the DC-DC converters 26 to 480V AC power, which can be supplied to the auxiliary systems 52 of the fuel cell system 10. The auxiliary load power conversion unit 32 can be any suitable power conversion unit such as an inverter. For example, the auxiliary load power conversion unit 32 can be a Dynapower MPS-125 EHV Inverter for Behind-the-Meter Energy Storage sold by Dynapower Company, LLC of South Burlington, Vermont. The battery unit 34 can be housed in the power electronics container 18 and can be configured to provide initial start-up power to the fuel cell system 10. The battery unit 34 can also be configured to regulate the input voltage of the DC-DC converters 26A-26F as the power request of the external unit 12 varies. Moreover, the battery unit 34 can also be configured to provide additional power to the external unit 12 as needed in the event one or more of the fuel cell units 22A-22F fail and cover power gaps between the fuel cell power and load. The battery unit 34 can be any suitable battery unit. For example, the battery unit 34 can be a 1000V lithium titanium oxide (LTO) battery.

As mentioned previously, the auxiliary systems 52 and/or components of the fuel cell system 10 can include one or more power panels 36A-36E. Power panel(s) 36A and 36B can be housed in the power electronics container 18 and can be configured to connect the auxiliary load power conversion unit 32 to other various components of the fuel cell container 16 and/or the power electronics container 18 via the power panels 36C-36E. The power panel(s) 36A-36E can include one or more circuit breakers and can be configured to protect the components of the fuel cell system 10 from power surges or voltage drops. The power panel(s) 36A-36E can also be configured to convert the 480V AC power outputted by the auxiliary load power conversion unit 32 to 120V AC power or 220V AC power depending on the voltage requirements of the external unit 12.

The fuel cell system 10 can also include an uninterruptable power supply (UPS) 40. The UPS 40 can be electrically connected to one or more of the power panels 36 and can be configured to supply the fuel cell system 10 and/or any auxiliary systems of the fuel cell system 10 with emergency power in the event that the battery unit 34 fails. The UPS 40 can also be connected to a utility feed 42. The fuel cell system 10 also includes a transformer 38 electrically connected to at least one of the power panels 36A and/or 36B. The transformer 38 can be configured to lower the input and/or output voltage of power panel(s) 36A-36B and/or the UPS 40.

Figure 3:
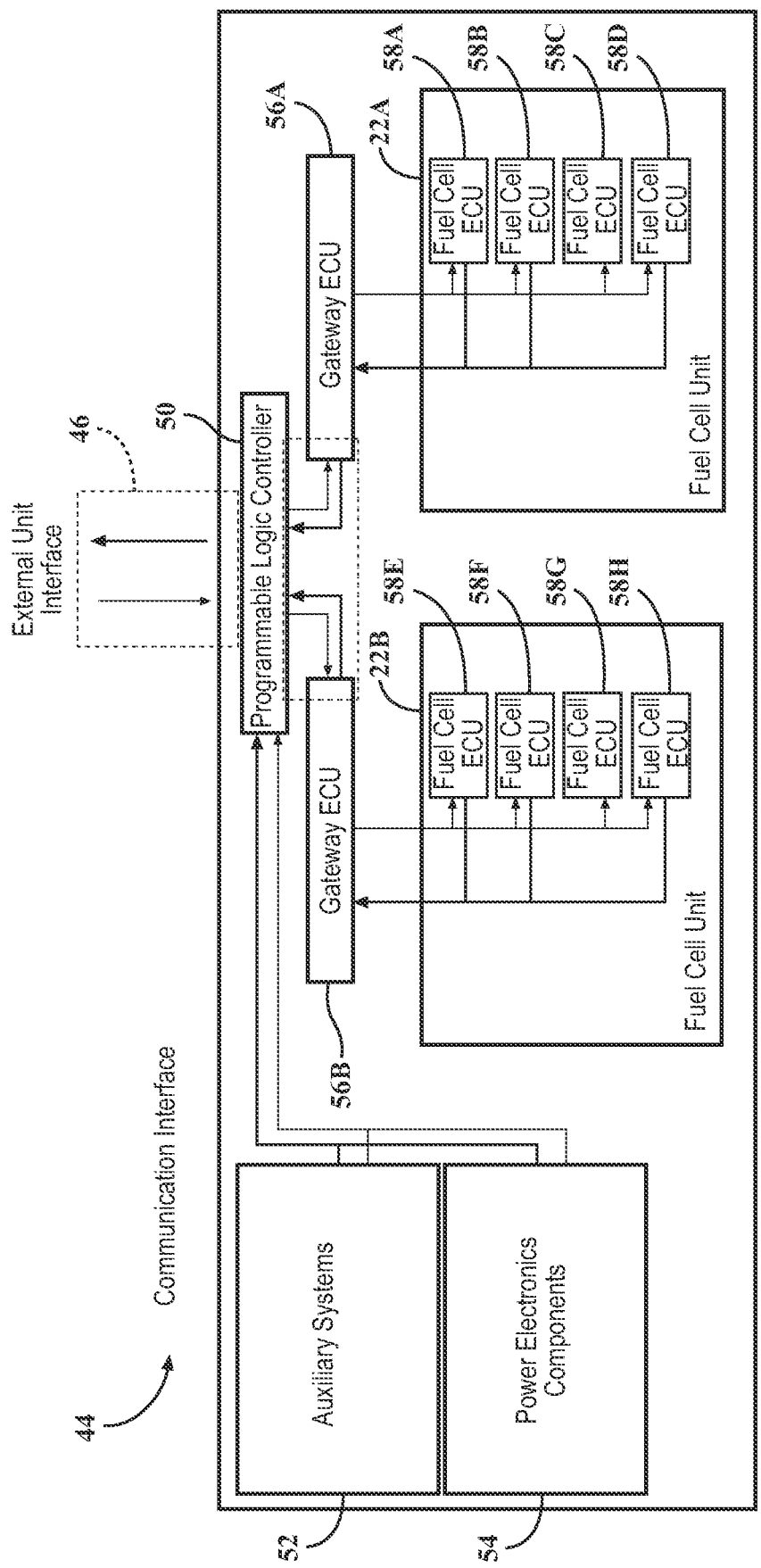
FIG. 3 illustrates one example of a communication interface for a fuel cell system.

Referring now to FIG. 3, the fuel cell system 10 can include a communication interface 44. The communication interface 44 includes various communications components configured to distribute and/or send commands and/or information between the external unit 12 and the fuel cell system 10. For example, the fuel cell system 10 can be configured to receive a power request from the external unit 12 through the communication interface 44 and operate the fuel cell system 10 according to the power request. Accordingly, the external unit 12 can include an external unit interface 46. The external unit interface 46 can be configured to send power requests to the fuel cell system 10.

The communication interface 44 can include a programmable logic controller (PLC) 50. The PLC 50 can include a processor coupled with a memory, a power supply, an input interface, and an output interface, among other components typical of PLCs. The PLC 50 can be configured to operate the various components of the fuel cell system 10 according to a power request from the external unit 12. The PLC 50 is also configured to receive and/or output requests to and/or from one or more of the auxiliary systems 52 and/or one or more of the power electronics components 54 of the fuel cell system 10.

The communication interface 44 can also include a plurality of gateway electronic control units (ECUs) 56A and 56B. The gateway ECU 56A and 56B can be electrically connected to the PLC 50 and to the fuel cell unit 22A and 22B. It should be understood only two fuel cell units 22A and 22B are shown for simplified illustrative purposes. In one example, the gateway ECU 56A may control one subset of fuel cell units, while the gateway ECU 56B will control another subset of fuel cell units.

The gateway ECUs 56A and 56B can be configured to operate the fuel cell units 22A and 22B, respectively, based on a power request from the external unit 12. The gateway ECUs 56A and 56B can also be configured to communicate with and/or operate one or more fuel cell ECUs 58 of the fuel cells within each fuel cell unit 22. For example, as stated previously, the fuel cell unit 22A may have four separate fuel cells that are connected in series, such as shown in FIG. 2. Each of those four separate fuel cells have an ECU that can control the operation of the fuel cell. In this example, the fuel cell unit 22A has fuel cell ECUs 58A-58D for its four fuel cells, while the fuel cell unit 22B has fuel cell ECUs 58E-58H for its four fuel cells. If the gateway ECUs 56A and 56B receive an "ON" command from the external unit 12, the gateway ECUs 56A and 56B can transmit this request to the fuel cell unit 22A and 22B and turn on each fuel cell unit 22A and 22B causing the operation of any fuel cells that comprise the fuel cell units 22A and 22 to begin producing electricity. The gateway ECUs 56A and 56B can distribute a power request equally or unequally across the fuel cell units 22A and 22B.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, the circuits may be integrated into a common integrated circuit board in various embodiments. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module." as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm so on. In one or more embodiments, a module may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, ladder logic, any other PLC text-based programming languages, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A fuel cell system, comprising:
   a plurality of fuel cell units housed in a fuel cell container and each configured to generate lower-voltage DC power;
   a plurality of DC-DC converters housed in the fuel cell container and each electrically connected to each of the fuel cell units and configured to convert the lower-voltage DC power to higher-voltage DC power;
   a primary load power conversion unit housed in a power electronics container and electrically connected to the plurality of DC-DC converters and configured to output a primary load to an external unit that is external to the fuel cell system;
   an auxiliary load power conversion unit housed in the power electronics container and electrically connected to the plurality of DC-DC converters and configured to output an auxiliary load to one or more auxiliary systems of the fuel cell system, the one or more auxiliary systems being necessary to keep the fuel cell system operating; and
   an uninterruptable power supply that supplies the fuel cell system and the one or more auxiliary systems of the fuel cell system with emergency power.

2. The fuel cell system of claim 1, wherein the primary load power conversion unit is configured to convert the higher-voltage DC power to AC power and wherein the primary load is the AC power.

3. The fuel cell system of claim 2, wherein the primary load is supplied to the external unit to power the external unit.

4. The fuel cell system of claim 3, wherein the external unit is a residential or commercial building.

5. The fuel cell system of claim 1, wherein the auxiliary load power conversion unit is configured to convert the higher-voltage DC power to AC power and wherein the auxiliary load is the AC power.

6. The fuel cell system of claim 5, wherein the auxiliary load is supplied to the one or more auxiliary systems of the fuel cell system to power the one or more auxiliary systems.

7. The fuel cell system of claim 1, further comprising one or more switchgear components housed in the power electronics container and configured to electrically connect the plurality of DC-DC converters to the primary load power conversion unit and the auxiliary load power conversion unit and configured to supply the lower-voltage DC power to an external unit.

8. The fuel cell system of claim 7, further comprising a battery unit housed in the power electronics container and electrically connected to the one or more switchgear components and configured to provide start-up power to the fuel cell system.

9. The fuel cell system of claim 8, further comprising an uninterruptable power supply housed in the power electronics container and configured to supply power to the fuel cell system in the event the battery unit fails.

10. A fuel cell system, comprising:
   a fuel cell container housing a plurality of fuel cell units each configured to generate lower-voltage DC power, and housing a plurality of DC-DC converters each electrically connected to each of the fuel cell units and configured to convert the lower-voltage DC power to higher-voltage DC power; and
   a power electronics container housing a primary load power conversion unit electrically connected to the plurality of DC-DC converters and configured to output a primary load to an external unit that is external to the fuel cell system, and housing an auxiliary load power conversion unit electrically connected to the plurality of DC-DC converters and configured to output an auxiliary load to one or more auxiliary systems of the fuel cell system, the one or more auxiliary systems being necessary to keep the fuel cell system operating, and housing an uninterruptable power supply that supplies the fuel cell system and the one or more auxiliary systems of the fuel cell system with emergency power, wherein the primary load power conversion unit and the auxiliary load power conversion unit are configured to convert the higher-voltage DC power to AC power, and wherein the primary load and the auxiliary load are AC power.

11. The fuel cell system of claim 10, wherein the primary load is supplied to the external unit to power the external unit.

12. The fuel cell system of claim 10, wherein the external unit is a residential or commercial building.

13. The fuel cell system of claim 10, wherein the auxiliary load is supplied to the one or more auxiliary systems of the fuel cell system to power the one or more auxiliary systems located within the fuel cell container.

14. The fuel cell system of claim 10, wherein the power electronics container further houses one or more switchgear components configured to electrically connect the plurality of DC-DC converters to the primary load power conversion unit and the auxiliary load power conversion unit and configured to supply the lower-voltage DC power to an external unit.

* * * * *